United States Patent [19]

Redin

[11] Patent Number: 5,623,433
[45] Date of Patent: Apr. 22, 1997

[54] EXTENDED NUMERICAL KEYBOARD WITH STRUCTURED DATA-ENTRY CAPABILITY

[76] Inventor: Jaime H. Redin, 25867 McBean Pkwy. #86, Valencia, Calif. 91355

[21] Appl. No.: 613,600

[22] Filed: Mar. 11, 1996

Related U.S. Application Data

[63] Continuation-in-part of Ser. No. 270,593, Jul. 5, 1994, abandoned, which is a continuation of Ser. No. 2,981, Jan. 11, 1993, abandoned.

[51] Int. Cl.⁶ ........................................................ G06F 3/02
[52] U.S. Cl. ........................................ 364/709.12; 341/22
[58] Field of Search .................. 364/709.12, 709.15, 364/710.1; 341/22; 345/169

[56] References Cited

U.S. PATENT DOCUMENTS

| | | | |
|---|---|---|---|
| 3,739,161 | 6/1973 | Gross et al. | 364/709.12 |
| 3,764,791 | 10/1973 | Kushio | 364/709.12 |
| 3,987,290 | 10/1976 | Dickinson | 364/710.1 |
| 4,134,536 | 1/1979 | Saito et al. | 364/709 |
| 4,761,750 | 8/1988 | Yoshino et al. | 364/709.12 |
| 4,833,632 | 5/1989 | Nishimura et al. | 364/709.04 |

*Primary Examiner*—David H. Malzahn

[57] ABSTRACT

An extended numerical keyboard (10) provided with four additional number-entry keys: three structure keys (11) and one swap key (12), located next to the matrix of ten digit keys and decimal point key found in conventional numerical keyboards, able to implement a structured input number operation in a way consistent with the oral expression of the number; a decoding method to convert a symbolic representation of the verbal expression of a number into a number; and a coding method to convert a number into a symbolic representation of the verbal expression of the number.

2 Claims, 14 Drawing Sheets

Procedure to convert a verbal numeral to a number.

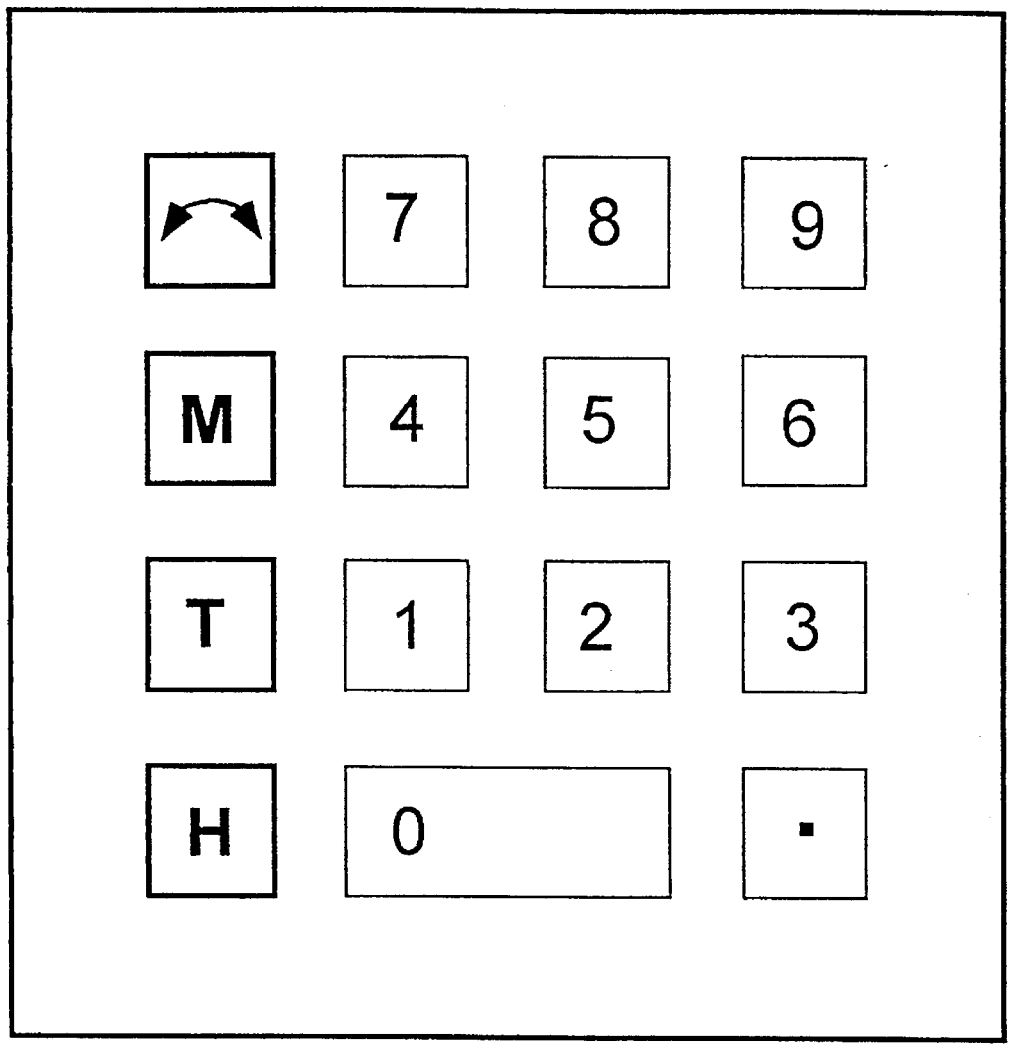
FIG 1. Data-Entry Key Matrix

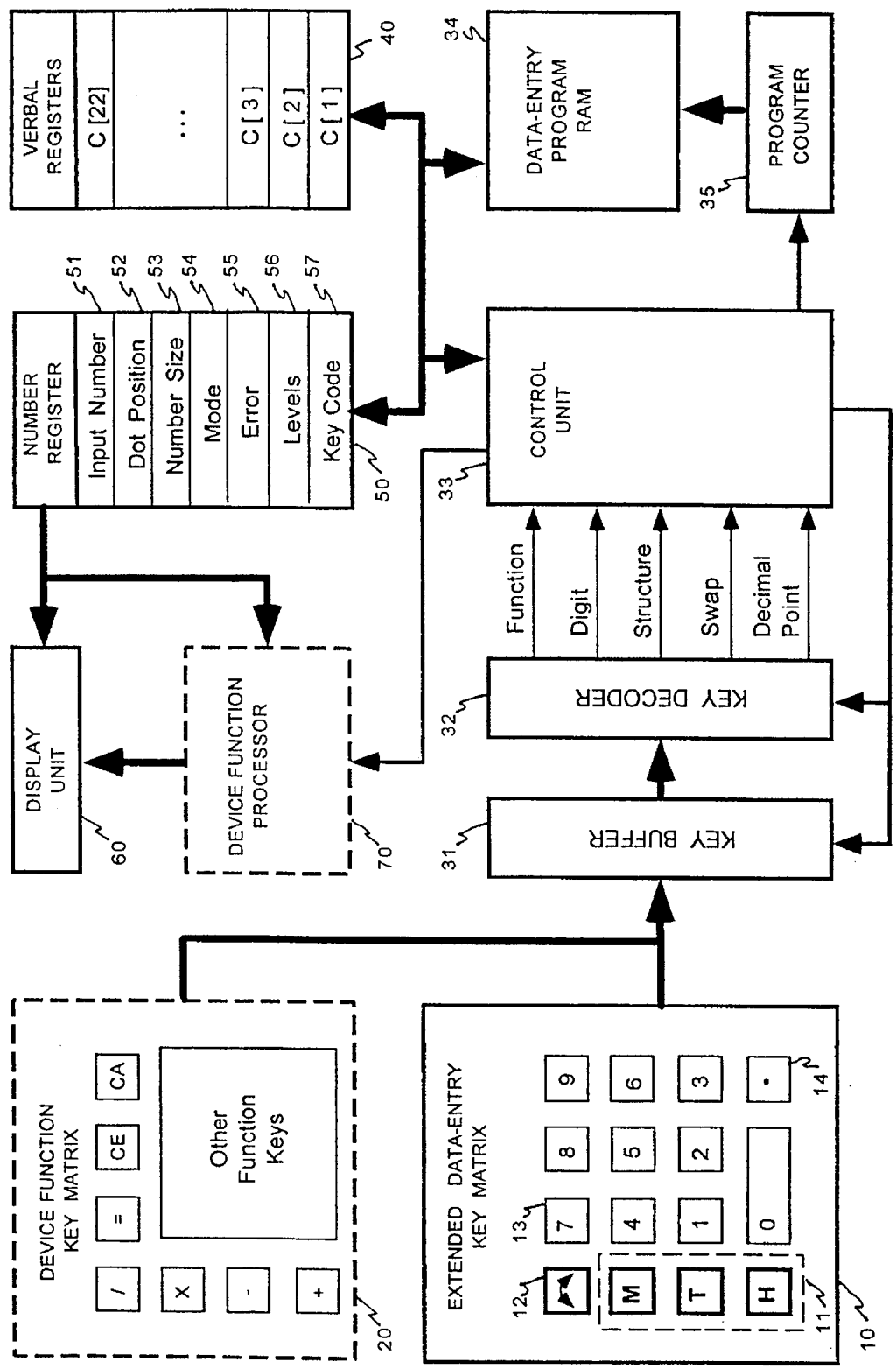
FIG 2. EXTENDED NUMERICAL KEYBOARD - BLOCK DIAGRAM

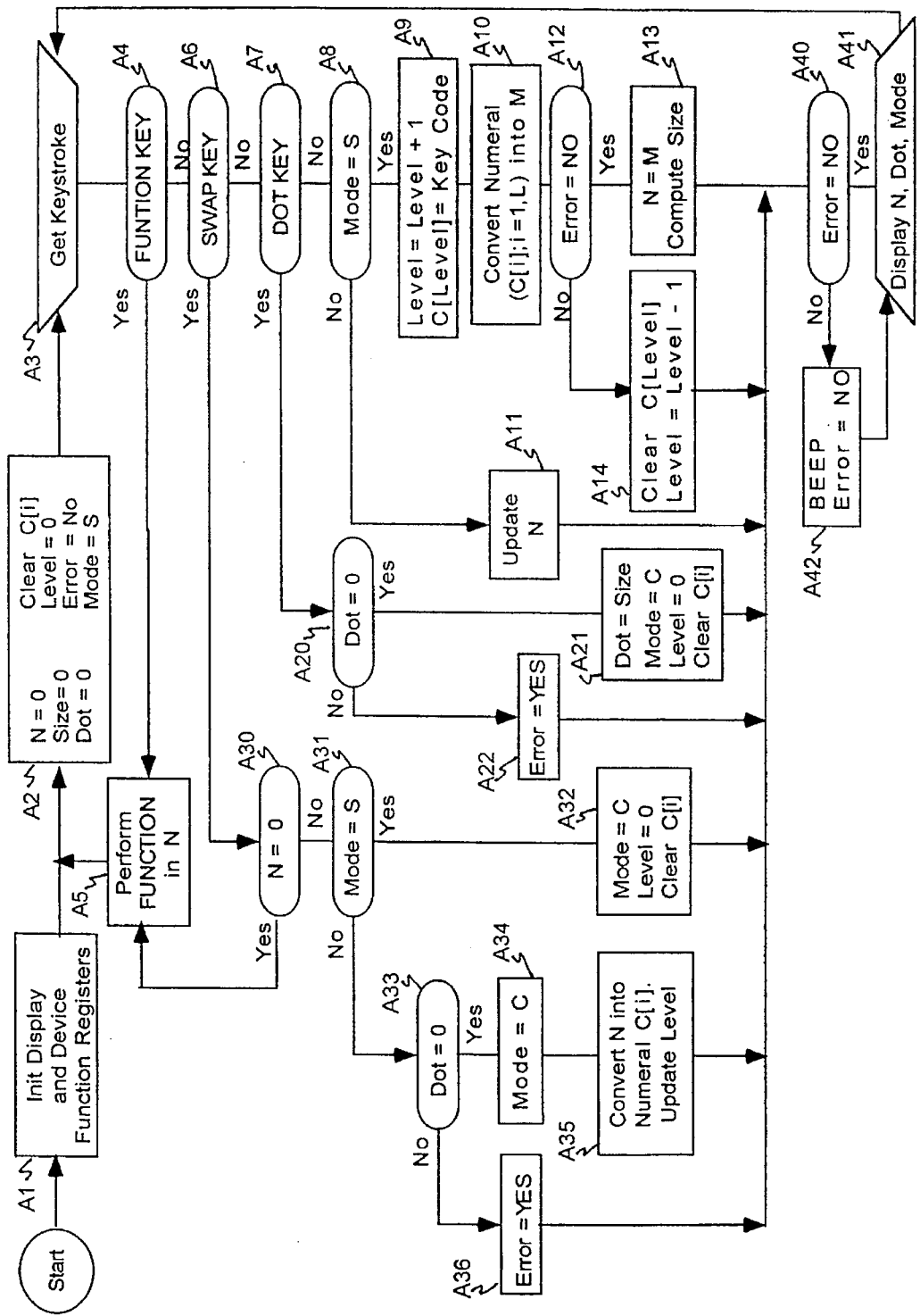
FIG. 3 STRUCTURED DATA ENTRY PROCEDURE

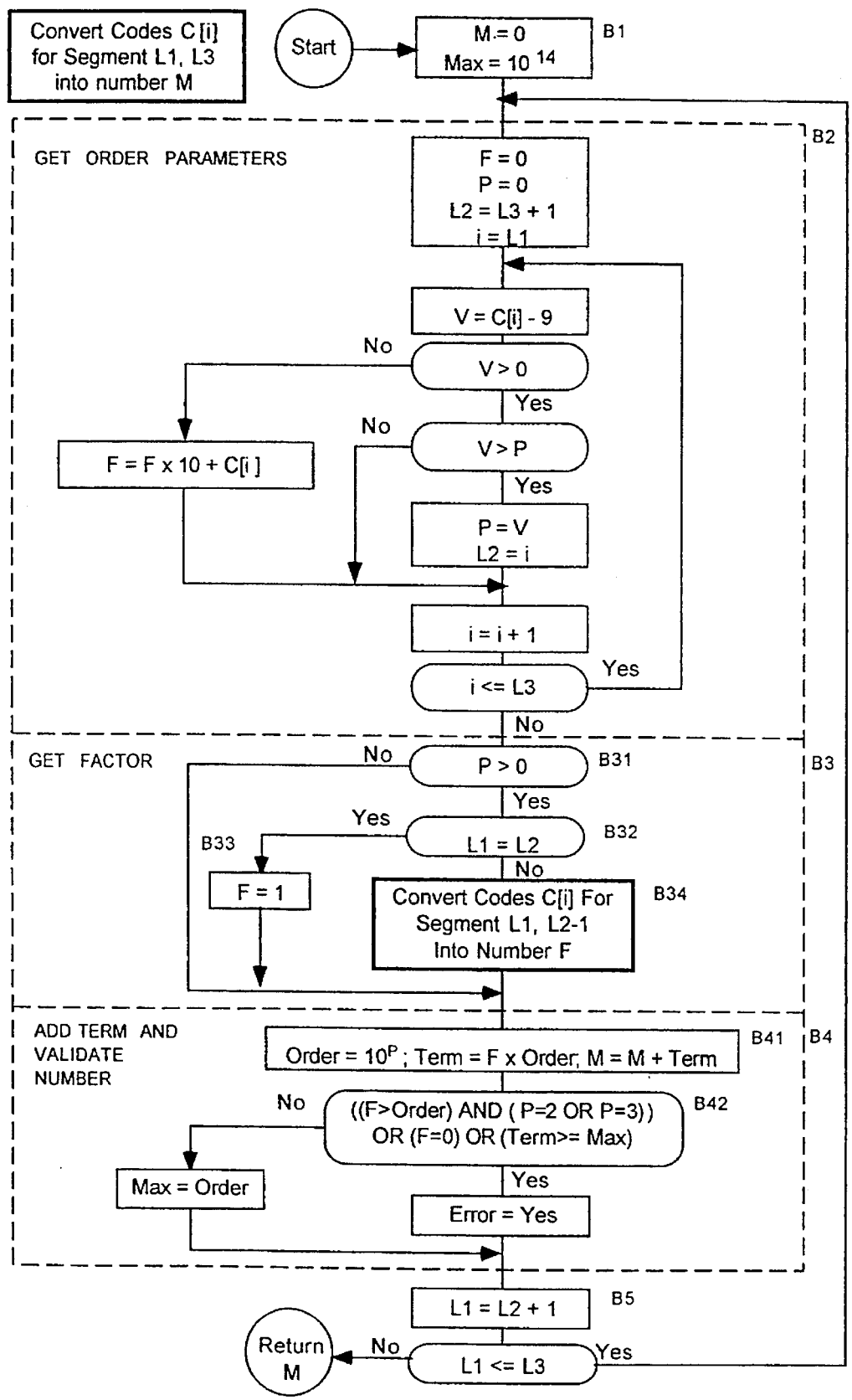
FIG. 4 Procedure to convert codes in segment L1, L3 into M.

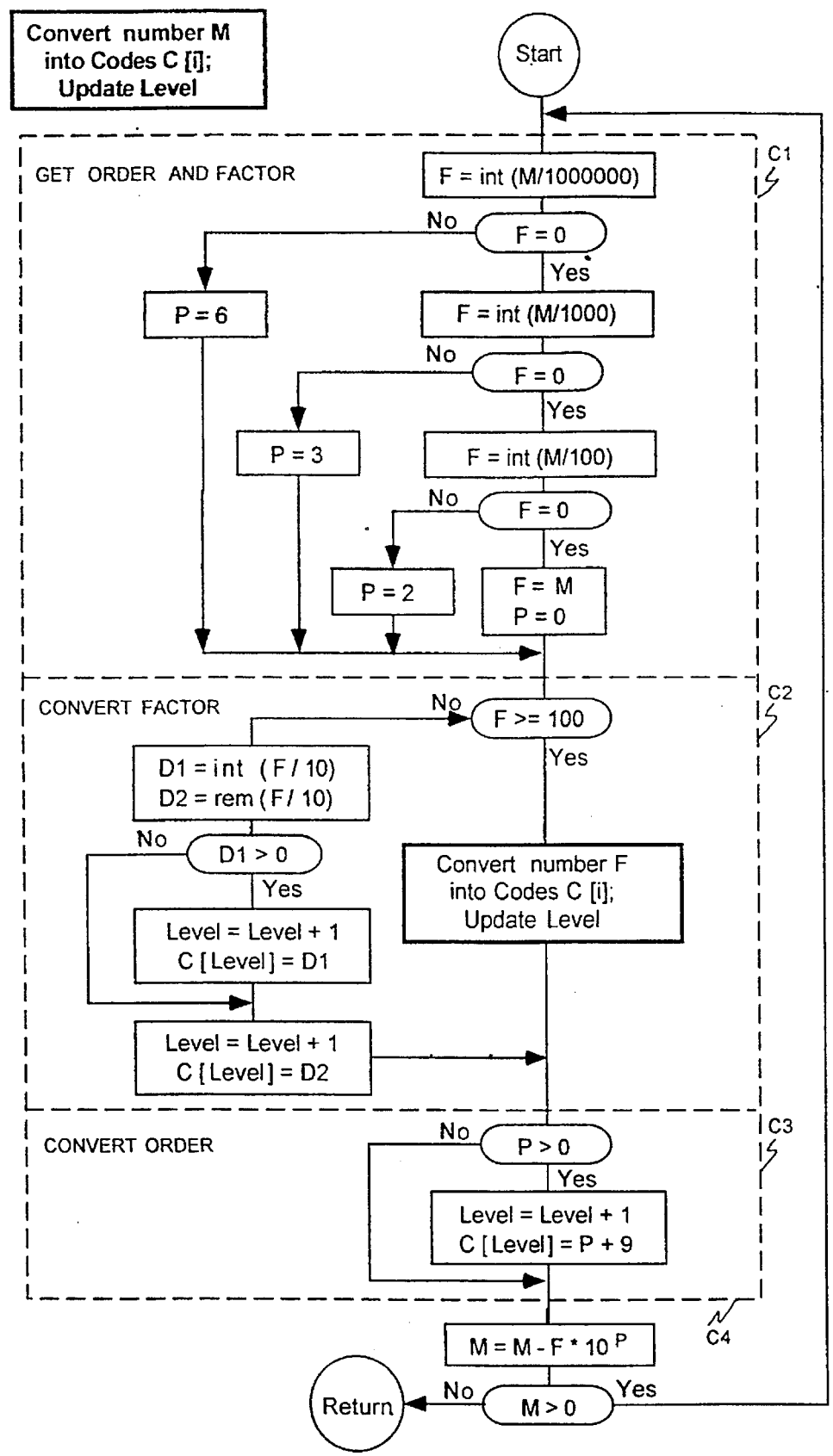
FIG. 5   Procedure to convert a number into a verbal numeral

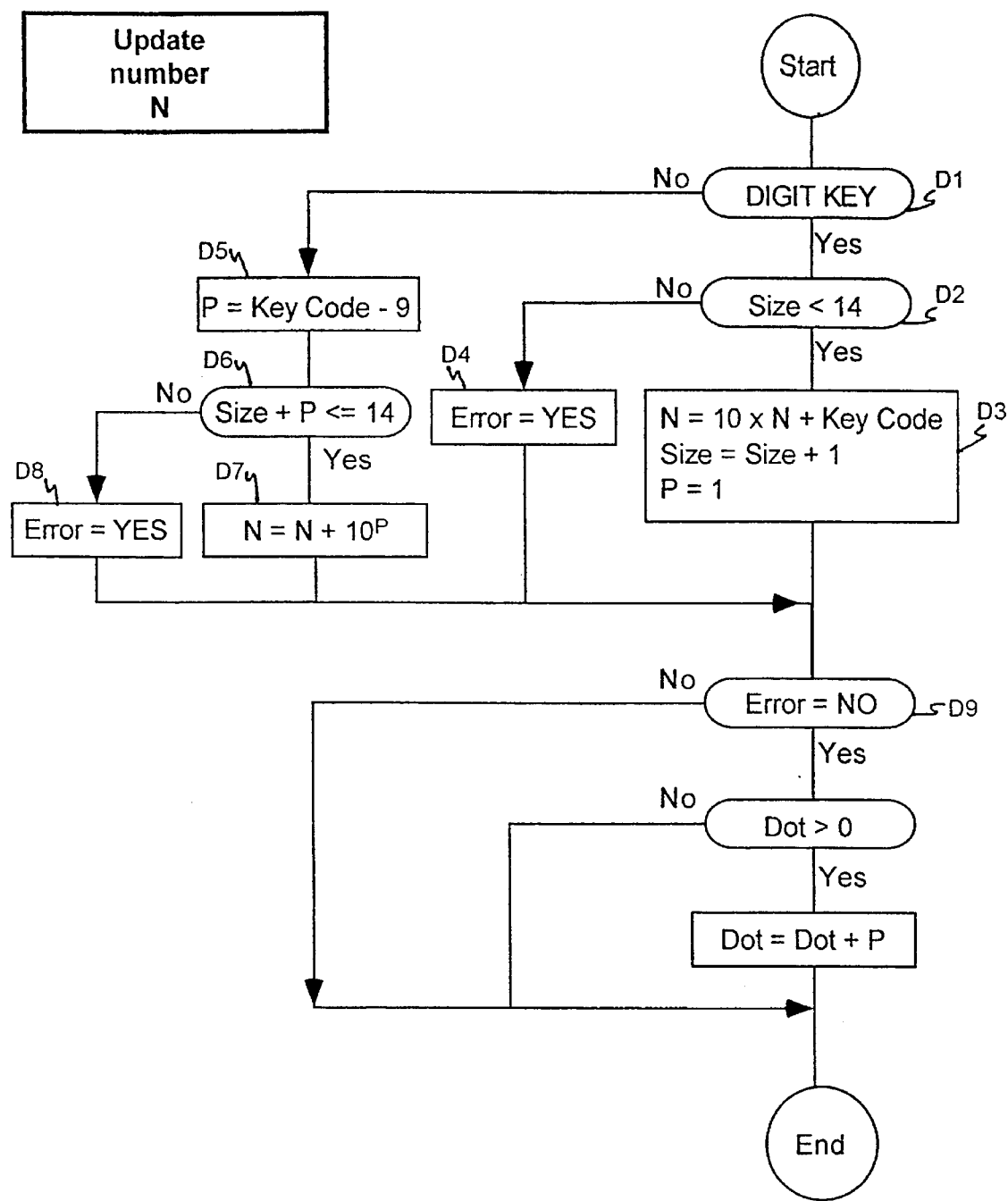
FIG. 6 Procedure to Update a Number

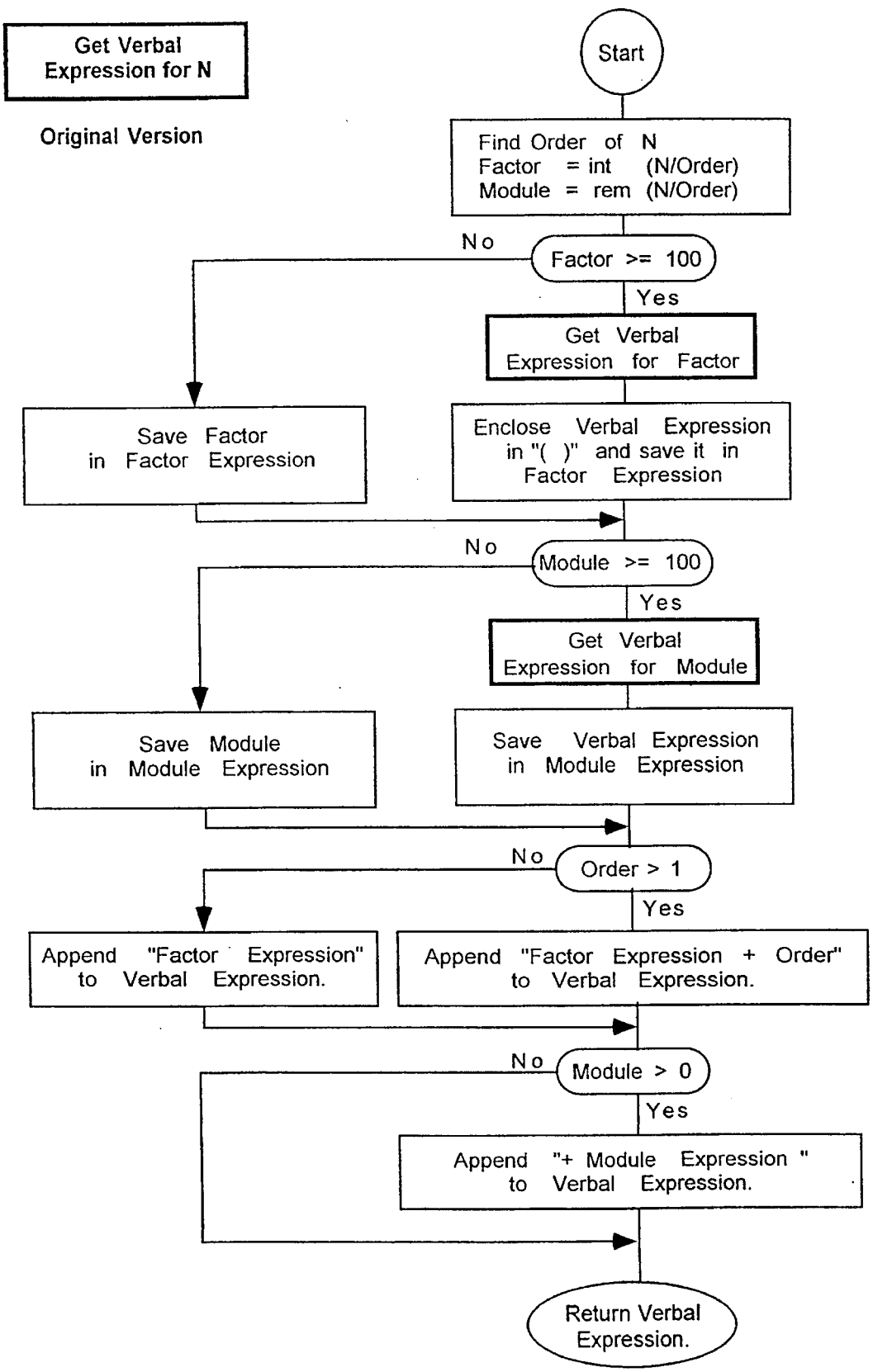
FIG 7. Procedure to Build a Verbal Expression for N.

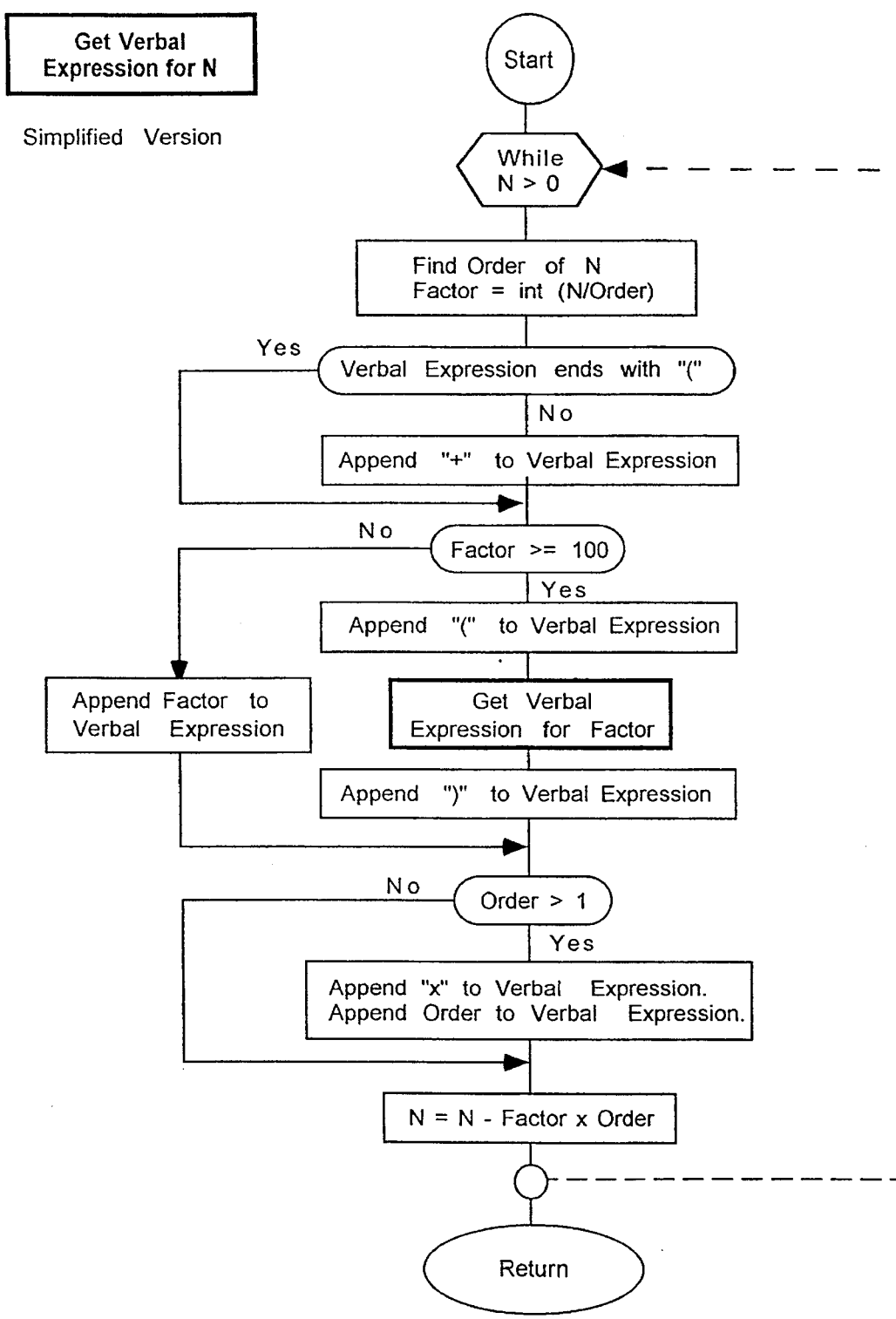
FIG 8. Procedure to Build a Verbal Expression for N.

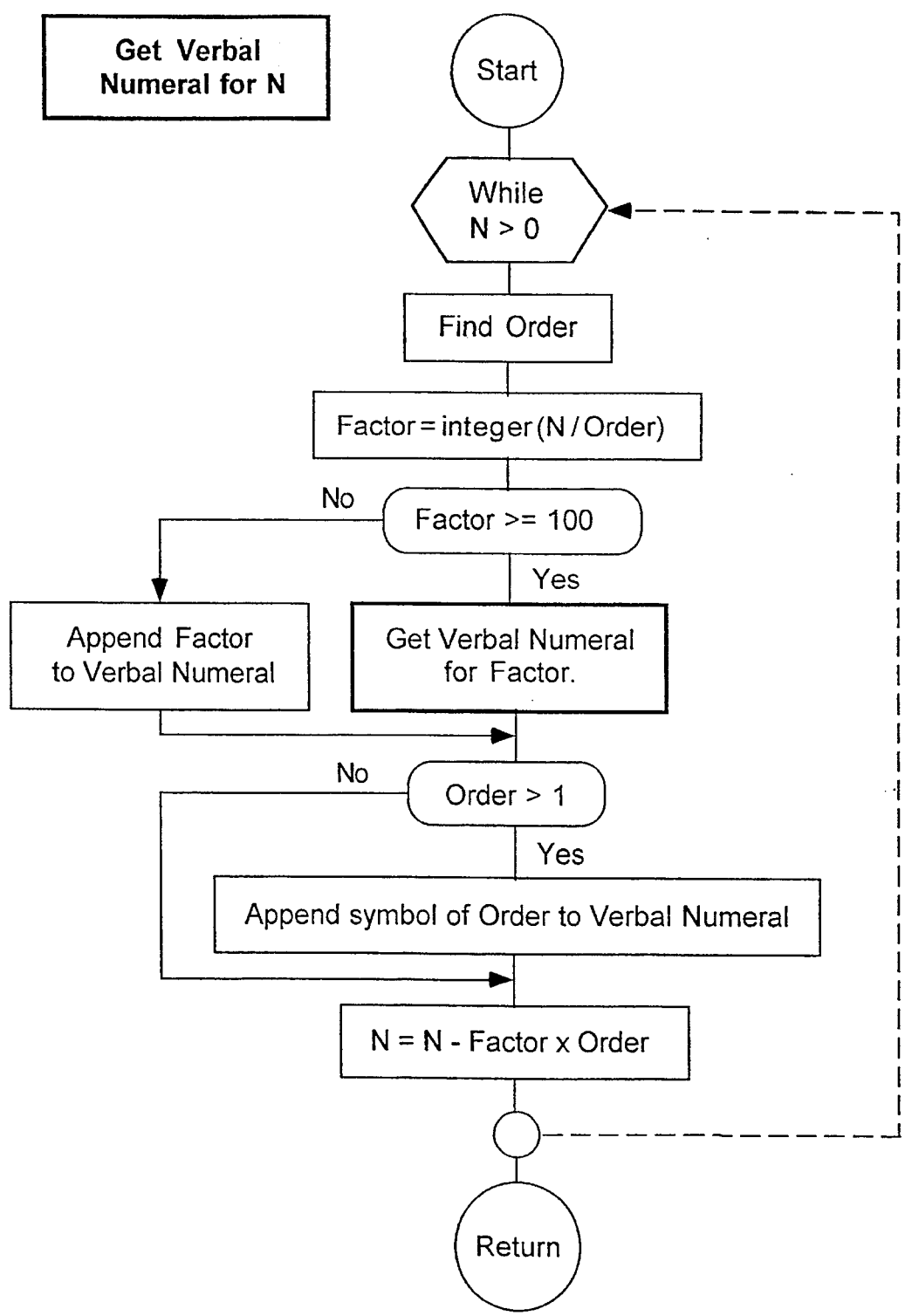
FIG 9. Get the Verbal Numeral of a Number

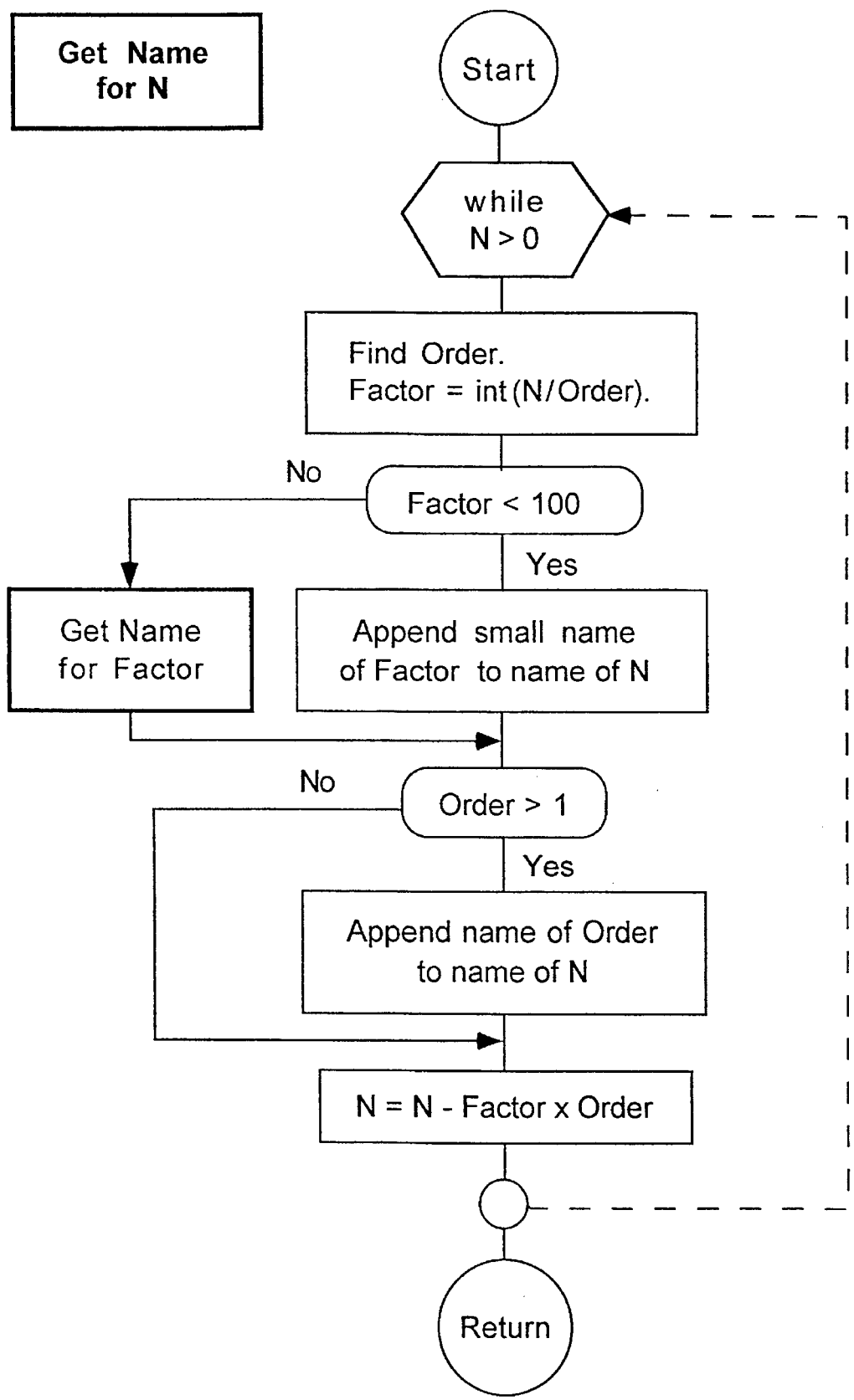
FIG 10. Procedure to get the name of a number

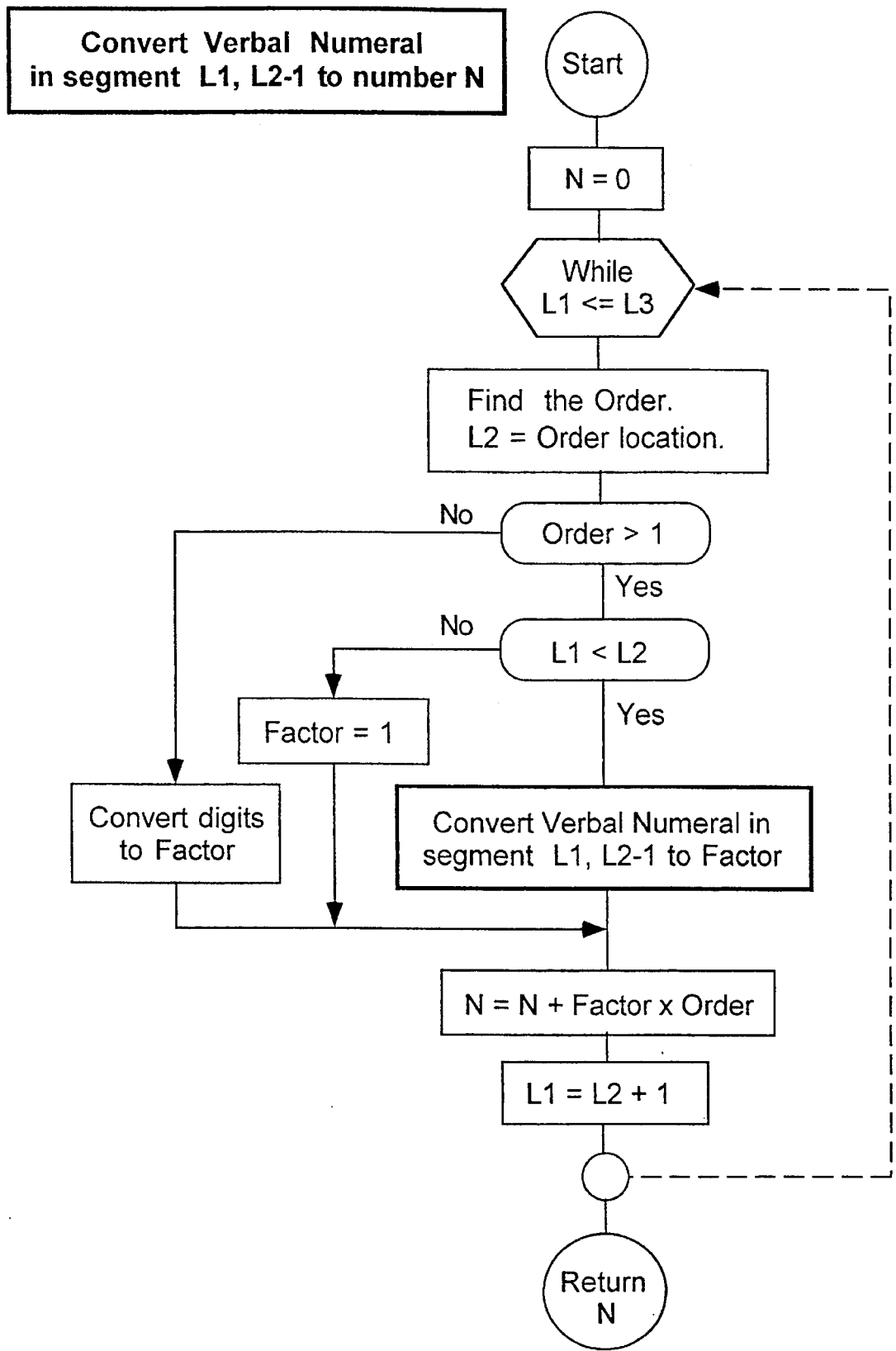
FIG 11. Procedure to convert a verbal numeral to a number.

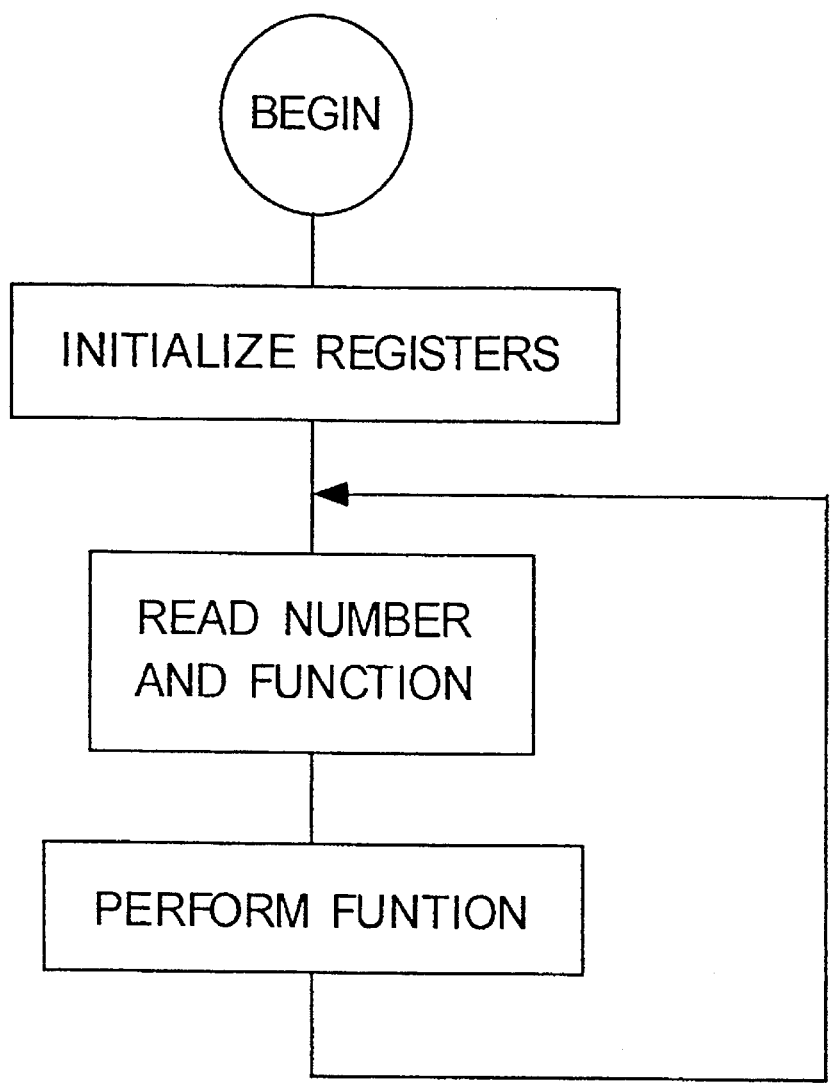
FIG 12. Calculator Main Processing Routine

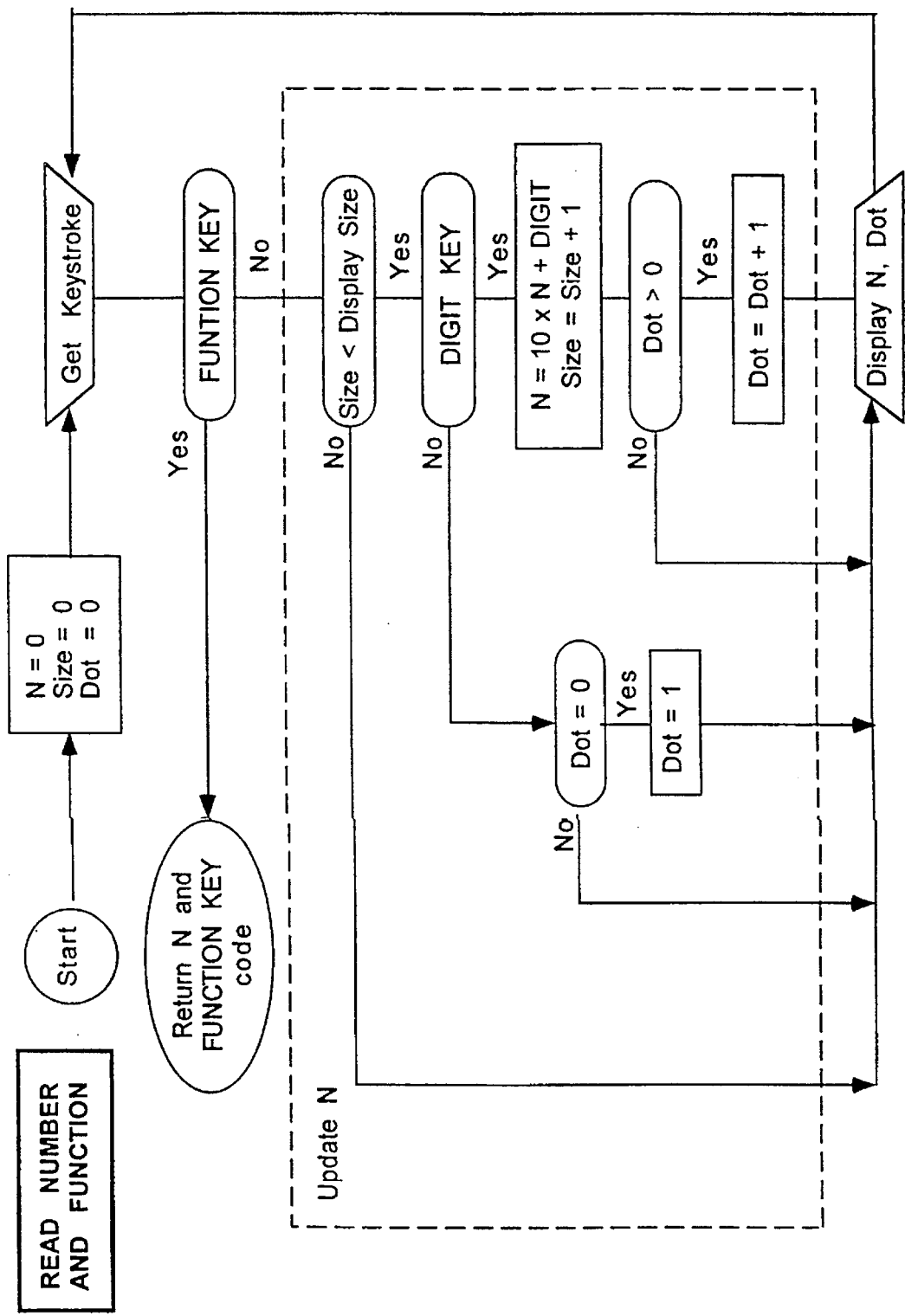
FIG 13. Non-Structured Data-Entry Procedure

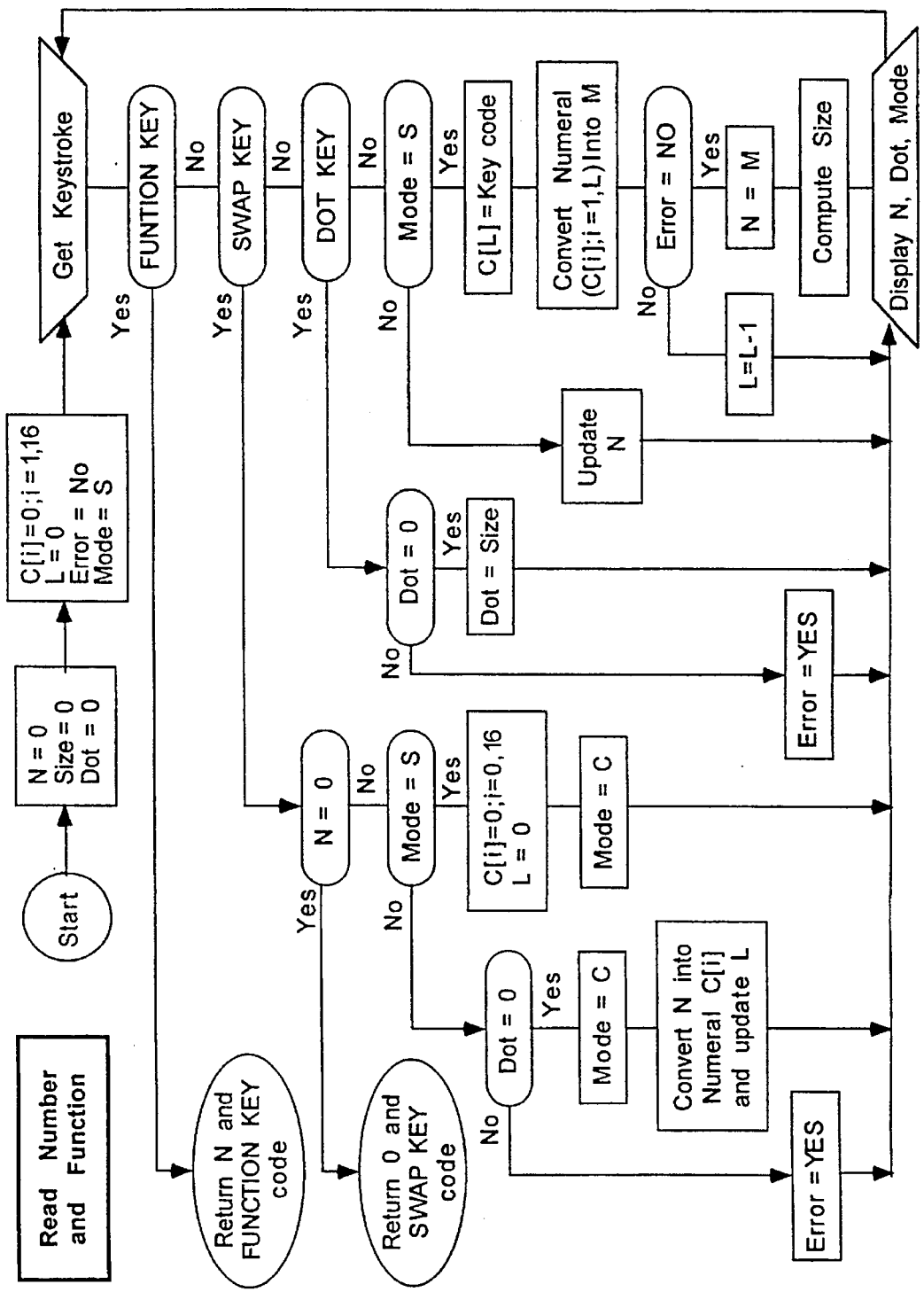
FIG 14. Structured Data-Entry Procedure 5,623,433

EXTENDED NUMERICAL KEYBOARD WITH STRUCTURED DATA-ENTRY CAPABILITY

This application is a continuation-in-part of Ser. No. 08/270,593 filed on Jul. 5, 1994, now abandoned, which is a continuation of Ser. No. 08/002,981 filed on Jan. 11, 1993 now abandoned.

BACKGROUND OF THE INVENTION

1. Field of the Invention

The present invention relates to an improvement in the number-entry keys of numerical keyboards used in electronic calculators and other number input devices with the addition of three structure keys, one swap control key and a method to enter numbers in a way consistent with the oral expression of the number.

2. Description of the Prior Art

Numerical keyboards used in electronic calculators have two categories of keys: number-entry keys and function keys. Number-entry keys are used to enter a number into an input register during a number input operation. Function keys are used to end the number input operation and start a sequence of procedures to process the number stored in the input register.

All numerical keyboards have a basic set of 10 number-entry keys corresponding to the "0" to "9" digit keys. Most numerical keyboards also have a decimal point key ".". Examples of other number-entry keys are the sign key "±" used to change the sign of the number, the delete key "del" used to delete the last digit or decimal point entered in the number, and the exponential key "EE" used to start entering the power of ten of a number expressed in scientific notation.

Keyboards of some specialized electronic calculators also have multi-zero number-entry keys "00" and "000" to simplify the number input operation by depressing them once instead of depressing the digit key several times.

All numerical keyboards used in electronic calculators have a set of seven function keys: "+", "−", "×", "/", "=", "CE", and "C" to perform the four arithmetic operations by using the number stored in the input register and a number previously stored in an accumulator register as operands, display the result in the display device, clear the contents of the input register or clear the contents of all registers; conventional calculators also have memory function keys "M+", "M−", "MR", and "MC" to perform operations on the memory register; specialized calculators have many other function keys to perform more complex operations including the capability to program the sequence of operations to be performed on the input register number and/or other registers included in the device.

Another example of function keys are the stop "*" and enter "#" keys used in telephone keyboards to indicate the end of a number input operation used to enter an extension or pin number.

As described above, most of the enhancements and special features on electronic calculators and other number input devices are related with the function keys. The conventional number-entry keys and number input procedure are always the same even in most advanced calculators and number input devices. A number is entered by depressing a sequence of digit keys and a decimal point key (if required) until a function key is depressed. An enhancement to the conventional number input procedure is described in U.S. Pat. No. 3,764,791 to Kashio (1973) where depressing a multi-zero number-entry key also generates a carry signal that ends one number input operation and starts a new data-entry operation until a function key is depressed; at this point the number input procedure is ended and the function is performed sequentially on all the numbers entered during the number input procedure. Nevertheless all number input procedures heretofore known have several disadvantages:

(a) as shown in the Appendix included at the end of this specification, numbers are structured entities whose structures are closely related with the way the number is expressed orally; conventional number input procedures require the number to be converted by a mental operation into a decimal numeral (string of single digits) before the number input procedure can be started;

(b) numbers with simple structures, for example, one million five, require depressing many times the digit number-entry keys, for example, 1000005;

(c) conventional number input procedures are not consistent with the way numbers are orally expressed and, therefore, with the way the mind conceives numbers; this inconsistency increases the chances of data-entry errors;

(d) enhanced conventional number input procedures based on the use of multi-zero keys are limited to avoid depressing the "0" digit key several times when entering numbers representing consecutive orders, for example, 1000 or 500; this holds true even in cases where the multi-zero key generates a carry signal to end a partial number input operation.

SUMMARY OF THE INVENTION

It is an object of the present invention to provide an extended numerical keyboard which, when implemented in electronic calculators or other number input devices, would allow the use of a structured number input procedure in addition to the conventional number input procedure. Several objects and advantages of the present invention are:

(a) to provide a way to convert the verbal expression of a number into a decimal numeral as part of the number input procedure;

(b) to reduce, in many instances, the number of keystrokes required to enter a number, for example, the number one million five can be entered by two keystrokes as opposed to the seven keystrokes required by the conventional and enhanced number input procedures;

(c) to provide a structured number input procedure consistent with the way numbers are orally expressed and, therefore, with the way the mind conceives numbers;

(d) to enhance the functionality of the multi-zero number-entry keys by allowing them to enter number structures rather than just a sequence of zeroes during a data-entry operation.

Still further objects and advantages will become apparent from a consideration of the ensuing description and drawings.

In order to achieve the objects of the present invention, there is provided an extended numerical keyboard according to the present invention including:

an extended number-entry key matrix with at least 10 digit keys "0" to "9", one "hundred" structure key "H", one "thousand" structure key "T" one "million" structure key "M" and one swap key "⇋";

a key buffer to store the code generated by depressing a key;

a key decoder to analyze the code stored in the key buffer;

a control unit to control the operation of the memory and other components of the system;

a program RAM to store the sequential instructions to be executed by the control unit in correspondence with the code received from the key decoder;

a set of verbal registers to store the sequence of digits and/or structure codes entered during the same number input operation;

a number register comprising a set of control registers to store the value of the input number and the parameters related with number input operation; this set of control registers may contain a data-entry mode register, a data-entry error register, a level register, a number size register, a dot position register and an input number register; and a display device to display the number stored in the input register, and the status of the data-entry mode register; optionally, this device could emit a "beep" signal whenever the data-entry error register has an error status.

With the above arrangement, to input a number the user can either enter the corresponding sequence of digits as in any conventional numerical keyboard or enter a combination of smaller numbers and structures in the same manner as the number is expressed orally. For example, to enter the number, "twenty-three million one thousand two hundred and seven" the user can enter the sequence of digits "23001207" or a combination of smaller numbers and structures as follows: "23M1T2H7".

Notice that when using the structured method, the structure keys "H", "M", and "T" are used to replace the words "hundred", "million", and "thousand" during the number input operation.

Each time the user enters a keystroke, the intermediate decimal representation of the number is displayed by the device. The sequence of keystrokes illustrated in the structured procedure of above example will modify the displayed number as follows:

| Keystroke | Display |
| --- | --- |
| 2 | 2 |
| 3 | 23 |
| M | 23000000 |
| 1 | 23000001 |
| T | 23001000 |
| 2 | 23001002 |
| H | 23001200 |
| 7 | 23001207 |

As in oral language, a structure pronounced immediately after pronouncing a shorter structure serves the purpose of extending the size of the shorter structure as in the case of "hundred thousand." On the other hand, the use of a structure before a number or after pronouncing a larger structure may imply a default reference to the number "one" preceding the structure (this is particularly true in Spanish language where defaults are used as a rule). For example, a reference to the number "thousand" may imply a reference to the number "one thousand" although the number "one" was not explicitly pronounced. As another example, the use of the words "five thousand hundred" may be interpreted as "five thousand one hundred." A similar approach is applied in the structured procedure. If a structure key is pressed at the beginning of the data-entry operation or immediately after pressing a larger structure key, the process defaults to the number one inserted before the corresponding structure. For example, the sequence "T6" yields the number "1006" and the sequence "5TH" yields the number "5100". Notice that because of this, the number illustrated above could also be entered as "23MT2H7".

The use of the structured procedure does not preclude the use of the non-structured procedure during the course of the same number input operation. In fact, the method described in this invention accepts non-structured sequences of keystrokes within a structured number. In the example illustrated above, the same result could be obtained by any of the following sequences:

23M1T2H7

23M1T207

23MT2H7

23MT207

23M1207.

Although it is semantically possible to describe the decimal fraction of a number in terms of substructures like "hundredths", "thousandths", etc it is not normal practice to use such an approach because of the added complexity in correctly pronouncing the decimal portion in structured mode. Nonetheless, a procedure could be easily implemented, using an approach similar to the one described in this invention, to enter the decimal portion in structured mode. However, the embodiment described in this patent automatically disable the structured mode when a decimal point is entered. After a decimal point is entered, the structure keys will behave as conventional multi-zero keys. For example, the keystrokes sequence "3H.5H1" will yield "300.5001".

The sequence of the digits and/or structure symbols used to represent or enter a number in structured mode is called a verbal numeral. Verbal numeral codes are stored in the verbal registers and used by a conversion algorithm loaded in program Ram to update the number stored in the input number register. The contents of the input number register is displayed after each keystroke during the number input operation. Pressing the dot or the swap key clears the verbal registers and changes the entry mode from structured to conventional. The verbal registers are not used in conventional mode because the structure keys act as conventional multi-zero keys and no conversion algorithm is required. Pressing the swap key while in conventional mode before entering a decimal point activates another conversion algorithm which uses the number stored in the input number register to fill-in the verbal registers with the corresponding sequence of verbal numeral codes resuming the structured data-entry mode. Pressing a function key ends the number input operation and passes the control to the function processor of the device attached to the extended numerical keyboard.

DRAWING FIGURES AND APPENDICES

In the drawings, closely related figures are identified by the same number but different alphabetic suffixes.

FIG. 1 is a layout showing a preferred arrangement of the number-entry keys required to implement the structured number input procedure according to the embodiment of the present invention.

FIG. 2 is a block diagram showing an arrangement of the circuits, process and storage elements required to support the number-entry keys described in FIG. 1.

FIGS. 3 to 6 are flow charts for explaining the operation of the extended numerical keyboard according to the embodiment of the present invention.

FIGS. 7 and 8 are flow charts showing an extended version and a simplified version of the procedure developed as part of this invention for building the verbal expression of a number.

FIG. 9 is a flow chart showing a procedure to get the verbal numeral of a number.

FIG. 10 is a flow chart showing a procedure to get the name of number.

FIG. 11 is a flow chart showing a procedure to convert a verbal numeral into a number.

FIG. 12 is a flow chart showing the main processing routine applied in most calculator devices.

FIG. 13 is a flow chart showing the main procedures applied by conventional calculators.

FIG. 14 is a flow chart showing the main procedures as would be applied by a calculator equipped with the extended keyboard described in this invention.

APPENDIX—LANGUAGE AND NUMERICAL STRUCTURES is a document showing the theory developed by the author of this invention to implement and support the conversion algorithms used in the embodiment of the present invention by using the concept of verbal numerals.

DETAILED DESCRIPTION OF THE PREFERRED EMBODIMENT

An extended numerical keyboard according to an embodiment of the present invention will be described with reference to FIGS. 1 to 6.

FIG. 1 shows a preferred arrangement of the basic number-entry key matrix in an extended numerical keyboard. An extended numerical keyboard must have at least 14 keys which include ten digit keys, three structure keys: hundred key "H", thousand key "T" and million key "M", and one swap key "⇋" to exchange between structured mode and conventional mode. Most numerical keyboards will also contain a decimal point key.

The actual implementation of the number-entry key matrix may differ depending on the ergonomic approach used by a given manufacturer, for example, the symbols "H", "T", "M" used in the key-tops of FIG. 1 may be replaced by symbols "0×2", "0×3" and "0×6" to make them language independent.

Referring to FIG. 2, an arrangement of the extended numerical keyboard to the embodiment of the present invention will be described.

An extended number-entry keys matrix 10 comprises three structure keys 11: hundred key "H" thousand key "T" and million key "M"; one swap key 12 "⇋"; ten digit keys 13 "0" to "9" and one decimal point key 14 ".". Matrix 10 is provided to perform a number input operation in structured and/or conventional data-entry mode. Structure keys 11 are provided to enter the number structures hundred, thousand and/or million in combination with the digits entered by using digit keys 13. Swap key 12 is provided to swap the status of a data-entry mode register 54 from structured to conventional mode or vice versa during a number input operation. Decimal point key 14 is provided to start the entry of the decimal part of the number if any; once key 14 has been depressed, mode register 54 is set to conventional mode and remains in that status until the end of that number input operation.

The function keys matrix 20 belongs to the device attached to the extended numerical keyboard.

Matrix 10 and matrix 20 generate a code signal when a key is depressed. A key buffer 31 receives the code signal from matrix 10 or 20 and stores the data. The data stored in key buffer 31 is transferred to a key decoder 32. A control unit 33 controls the operation of the other sections in accordance with the information received from decoder 32 and the sequential instructions stored in a data-entry program RAM 34. Control unit 33 loads the sequential instructions in an area of RAM 34 designated by a program counter 35. The location address in counter 35 is controlled by control unit 33.

A set of verbal registers 40 stores the sequence of digits and/or structure codes entered during a number input operation while the mode register 56 is set to structured mode. The number of cells in verbal registers 40 is a function of the maximum number of digits in the decimal numeral that can be displayed by a display unit 60 as follows:

| Display capacity (digits) | Verbal registers (cells) |
| --- | --- |
| 8 | 12 |
| 10 | 16 |
| 12 | 19 |
| 14 | 22 |
| 16 | 26 |

The number of cells used in verbal registers 40 of block diagram of FIG. 2 would allow display unit 60 to have a maximum capacity of 14 digits.

A set of number registers 50 stores the value of the number entered during the number input operation and the parameters related with the number input operation. An input number register 51 stores the value of the number entered during the number input operation; this value is stored as an integer number even if the number contains a decimal point. A dot position register 52 stores the relative position of the decimal point in the input number; the value of this register is zero if the input number contains no decimal point. A number size register 53 stores the number of digits contained in the input number.

A mode register 54 stores the structured or conventional data-entry mode status. An error register 55 stores the error status (YES or NO) during every step of the number input operation. A level register 56 stores the number of occupied cells in verbal registers 40. A key code register 57 stores the key code decoded by decoder 32.

Display unit 60 displays at least the input number stored in number register 51, the decimal point according with contents of position register 52 and the status of mode register 54. Optionally, display unit 60 could emit a "beep" signal every time error register 55 is set to YES.

The device function processor 70 belongs to the calculating device attached to the extended numerical keyboard. Processor processes the number entered by a number input operation after a function key in matrix 20 has been depressed. The result of this process is displayed in display unit 60.

Operation

Operation of the extended numerical keyboard with the above arrangement will be described with reference to the flow chart shown in FIG. 3.

In step A1, when the device attached to the extended numerical keyboard is first turned on, display unit 60 and processor 70 are initialized; the control flow advances to step A2.

In step A2, number registers 40 and verbal registers 50 are initialized and mode register 54 is set to structured data-entry mode; the control flow advances to step A3.

In step A3, the operator depresses a key in matrix 10 or matrix 20. The signal code generated by the keystroke is stored in key buffer 31. Then, key decoder 32 reads a signal code from key buffer 31, determines its key code and passes the key code to control unit 33. Control unit 33 stores the key code in code register 57. The flow control advances to step A4.

In step A4, it is determined if the contents of code register 57 corresponds to a function key, if this is true the control flow advances to step A5, otherwise the control flow advances to step A6.

In step A5, the contents of number register 51, position register 52 and code register 57 are passed to processor 70. Processor 70 performs the function and displays the result in display unit 60; the control flow returns to step A2.

In step A6, it is determined if the contents of code register 57 corresponds to a swap key; if this is true the control flow advances to step A7, otherwise the control flow advances to step A30.

In step A7, it is determined if the contents of code register 57 corresponds to a decimal point key, if this is true the control flow advances to step A20, otherwise the control flow advances to step A8.

In step A8, it is determined if the contents of mode register 54 is set to STRUCTURED, if this is true the control flow advances to step A9, otherwise the control flow advances to step A11.

In step A9, the contents of level register 56 is increased by one and the contents of code register 57 is stored in one of verbal registers 40 at the location corresponding to the value stored in level register 56; the control flow advances to step A10.

In step A10, the conversion algorithm described in FIG. 4 is applied to convert the codes stored in verbal registers 40 into a temporary number. The temporary number is stored in a variable M of program RAM 34. The conversion algorithm also checks the validity of the sequence of codes stored in verbal registers 40 and updates the contents of error register 55 accordingly. Then, the control flow advances to step A12.

In step A11, the update procedure described in FIG. 6 is applied either to update the contents of number register 51 or to set the contents of error register 55 to YES. Then, the control flow advances to step A40.

In step A12, it is determined if the contents of error register 55 is set to NO, if this is true the control flow advances to step A13, otherwise the control flow advances to step A14.

In step A13, the temporary number generated in step A10 is moved from variable M of program RAM 34 to number register 51. A procedure is then applied to compute the number of digits in the decimal representation of the number stored in number register 51 and to move the result into size register 53. The control flow advances to step A40.

In step A14, the last code stored in verbal registers 40 is replaced by zero and the contents of level register 56 is decreased by one. The control flow advances to step A40.

In step A20, it is determined if the contents of position register 52 is zero, if this is true the control flow advances to step A21, otherwise the control flow advances to step A22.

In step A21, the contents of size register 53 is moved to position register 52, then, the contents of mode register 54 is set to CONVENTIONAL, the contents of level register 56 is set to zero, and all verbal registers 40 are initialized with zeroes. The control flow advances to step A40.

In step A22, the contents of error register 55 is set to YES.

In step A30, it is determined if the contents of number register 51 is zero, if this is true the swap key code is treated as a function code and the control flow returns to step A5, otherwise the control flow advances to step A31.

In step A31, it is determined if the contents of mode register 54 is set to STRUCTURED, if this is true the control flow advances to step A32, otherwise the control flow advances to step A33.

In step A32, the contents of mode register 54 is set to CONVENTIONAL, the contents of level register 56 is set to zero, and all verbal registers 40 are initialized with zeroes. The control flow advances to step A40.

In step A33, it is determined if the contents of position register 52 is equal to zero; if this is true the control flow advances to step A34, otherwise the control flow advances to step A36.

In step A34, the contents of mode register is set to CONVENTIONAL; the control flow advances to step A35.

In step A35, the conversion algorithm described in FIG. 5 is applied to convert the contents of number register 51 into a sequence of codes which are stored in verbal registers 40. The conversion algorithm also updates the contents of level register accordingly. Then, the control flow advances to step A40.

In step A36, the contents of error register 55 is set to YES; the control flow advances to step A40.

In step A40, it is determined if the contents of error register is set to NO, if this is true the control flow advances to step A41, otherwise the control flow advances to step A42.

In step A41, the decimal representation of the contents of number register 51, the decimal point according with the contents of position register 52 and the data-entry mode according with the contents of mode register 54 are displayed in display unit 60. The control flow returns to step A3.

In step A42, display unit 60 generates a short sound signal and the contents of error register 55 is set to NO. The control flow returns to step A3.

Conversion of a Verbal Numeral into a Number

The algorithm applied to convert the verbal numeral stored in verbal registers 40 into a number is a recursive procedure supported by the theory described in the Appendix of this specification. Its main objective is to reconstruct and solve the arithmetic expression that is encoded in a verbal numeral. An example of an implementation of this algorithm will be described with reference to the flow-chart shown in FIG. 4; all variables referred in the following description are memory cells in program RAM 34. The limits L1 and L3 of the segment are passed as arguments to the algorithm. L1 is the location of the lower cell in the segment and L3 is the location of the upper cell in the segment; for example, if the segment would include all the stored codes, L1 would be equal to 1 and L3 would be equal to the contents of level register 56.

Step B2 contains a loop that scans the key codes stored in the segment of verbal registers 40 subject to analysis looking for the location L2 and power value P of the largest structure code stored in the segment. The procedure assumes that the code keys used are 0 to 9 for the digits and 11, 12, and 15 for structures hundred, thousand, and million.

To take advantage of the loop operation, the value of variable F is also obtained, however, this value has no meaning if the segment contains one or more structure codes. After the loop is completed the control flow advances to step B3.

Step B3 computes the value of variable F when the segment contains one or more structure codes.

In step B31, it is determined if the value of variable P is greater than zero, if this is true the segment contains structures and the control flow advances to step B32, otherwise the segment only contains digits and the control flow advances to step B4.

In step B32, it is determined if the value of variable L1 is equal to the value of variable L2, if this is true the digit 1 has been defaulted by the operator, for example, when H entered instead of 1H to mean "one hundred" and the control flow advances to step B33; otherwise the control flow advances to step B34.

In step B33, the value of variable F is set to 1. This is done to enter as a factor the value defaulted by the operator. The control flow advances to step B4.

In step B34, the value of variable F is evaluated by applying recursively the same procedure described in FIG. 4 for the segment contained between locations L1 and L2-1. Then, the control flow advances to step B4.

Step B4 computes a new term and adds the term to the number, and validates the parameters used to construct the term. The validation rules are: a factor cannot be larger than the order, leading zeroes are not allowed, and a term can not be larger than the order of the previous term in the expression.

In step B42, it is determined if any of the three validation rules for a verbal numeral have been violated, if this is true error register 55 is set to YES, otherwise the value of variable Order is assigned to variable Max. The control flow is advanced to step B5.

In step B5, variable L1 is assigned a value equal to the value of variable L2 plus one. Then it is determined if the value of variable L1 is less or equal to the value of variable L3, if this is true the control flow returns to step B2, otherwise the procedure is ended by returning the value of variable M to the calling step.

Conversion of a Number into a Verbal Numeral

The algorithm applied to convert the number stored in the number register 51 into a verbal numeral is a recursive procedure supported by the theory described in the Appendix of this specification. Its basic objective is to break down the number into an arithmetic expression consistent with the verbal numeral. An example of an implementation of this algorithm will be described with reference to the flow chart shown in FIG. 5; all variables referred in the following description are memory cells in program RAM 34. The contents of variable M to be converted is passed as argument to the algorithm.

In step C1, the order power and the factor parameters of the number are computed by finding the power of the largest structure contained in the number, then dividing the number by the value of that structure and using the integer result of the division as the factor. If the number contains no structure the number is used as factor. The values of the order power and the factor are stored in variables P and F respectively. The control flow advances to step C2.

In step C2, it is determined if the value of variable F is greater or equal to 100, if this is true the procedure described in FIG. 5 is applied recursively on the value of variable F otherwise the digits corresponding to the decimal representation of the value of variable F are found and stored in verbal registers 40. The control flow advances to step C3.

In step C3, it is determined if the value of variable P is greater than zero, if this is true the structure code is computed by adding 9 to the value of variable P and the result is stored in verbal registers 40. The control flow advances to step C4.

In step C4, the value of variable M is decreased by the product of the value of variable F times 10 to the power of the value of variable P. Then, it is determined if the value of variable M is greater than zero, if this is true the control flow returns to step C1, otherwise the procedure is ended and returns to the calling step.

Operation in Conventional Mode

The procedure applied to update the contents of number register 51 when a digit or structure key is entered in conventional mode will be described with reference to the flow-chart shown in FIG. 6. This procedure is not a special algorithm but an expansion of the block A11 in FIG. 3.

In step D1, it is determined if the contents of code register 57 corresponds to a digit key, if this is true the control flow advances to step D2, otherwise the control flow advances to step D3.

In step D2, it is determined if the contents of size register 53 is less than the maximum number of digits than can be displayed by display unit 60, if this is true the control flow advances to step D3, otherwise the control flow advances to step D4.

In step D3, the contents of number register 51 is multiplied by ten and then the value of code register 57 is added to the result; the result of this operation is stored in number register 51. The contents of size register 53 is increased by one, and a variable P in program RAM 34 is assigned a value 1. Then, the control flow advances to step D9.

In step D4, error register 55 is set to YES; the control flow advances to step D9.

In step D5, a variable P in program RAM 34 is assigned the result of subtracting nine from the contents of code register The control flow advances to step D6.

In step D6, it is determined if the result of adding the contents of size register 53 to the value of variable P in program RAM 34 is less or equal to the maximum number of digits than can be displayed by display unit 60, if this is true the control flow advances to step D7, otherwise the control flow advances to step D8.

In step D7, the contents of number register 51 is multiplied by 10 to the power of the value of variable P in program RAM 34. The control flow advances to step D9.

In step D8, error register 55 is set to YES; the control flow advances to step D9.

In step D9, it is determined if error register 55 is set to YES and if the contents of position register 52 is greater than zero, if both conditions are true the contents of position register 52 is incremented by the value of variable P, otherwise the procedure is ended.

SUMMARY, RAMIFICATIONS, AND SCOPE

Numerical keyboards with structure keys able to build numbers by using verbal numerals will give users greater flexibility in number input operations.

The structured data-entry method described in this patent simplifies the data-entry process, especially when entering large numbers with several zeroes, and has several advantages over the conventional non-structured method:

* it eliminates the need to mentally convert a number into a sequence of digits before entering the number by permitting users to enter a number in the same way as the number is orally expressed;

* it allows users to simultaneously enter a number as the number is dictated by another person (as is the practice in some data-entry arrangements). This is not possible when using the traditional non-structured procedure because the person entering the number must wait for the entire number to be dictated before being able to mentally construct the sequence of digits to be entered;

* it reduces the number of keystrokes required to enter a number that has several embedded zeroes or a simple structure;

* it increases the flexibility of a number input operation by providing several alternative ways to enter the same number;

* it reduces the possibility of typing errors by validating the consistency of the verbal numeral before accepting a new digit or structure. For example, in a conventional data-entry operation, if a user meaning to enter the number "one hundred sixty-five" by accident presses the digit "4" after entering the number, the user will end with number "1654" and may not even be aware of this, however, using the structured procedure, the sequence of keystrokes "H654" will yield the number "165" followed by a signal advising that the structure "hundred" cannot accept additional digits;

* it allows the simultaneous use of the structured and non-structured procedure during a number input operation without the need for the user to toggle the swap key between modes. Note that the swap key, if pressed, only toggles the mode for the current number input operation;

* it allows users to enter sequences of non-structured zeroes when a structure key is pressed after a decimal point or at any time if the mode is changed to conventional by pressing the swap key; in this mode, the structure keys behave in a way similar to the conventional multi-zero keys found in some specialized keyboards;

Although the above description and the attached figures and examples contain several specificities, these should not be construed as limiting the scope of the invention but as merely providing illustrations of some of the preferred implementations of this invention. For example, the layout, number, shape, size, symbols, and/or color of the structure keys could be changed to improve the ergonomics or the appearance of the keyboard. Similarly, the block arrangement presented in FIG. 1, the conversion algorithms and/or procedures presented in FIGS. 2 to 6 as well-as the actual instructions or program used to implement the method described in this patent could differ depending on the nature of the device, the technology used in its construction and the native language used by the potential user of the keyboard.

Thus, the scope of this invention should be defined by the appended claims and their legal equivalents rather than by the examples given.

APPENDIX

LANGUAGE AND NUMERICAL STRUCTURES

Background and Objectives

When a number is expressed orally, several rules, which are sometimes language dependent, must be applied in order to determine the proper way to express the number.

For example, the number 100,000 cannot be expressed as "One thousand hundred" (although it can be actually considered as made up of thousand hundreds), instead, it must be expressed as "One hundred thousand." Another interesting example is the way the number 1,200 can be expressed in English; note that in this case the notation "Twelve hundred" or "One thousand two hundred" are equally acceptable; this does not hold true in other languages like in Spanish, when only the equivalent for the second form is accepted: "Mil docientos."

The purpose of this document is to analyze the rules that govern the expression of numbers in the English language, as well as its similarities and main differences with other occidental languages such as Spanish, French and Dutch. This may prove to be useful in designing a new method to input numbers in numerical devices such as computers and electronic calculators.

Small Numbers

In every language, special names and/or special naming conventions are applied to numbers under 100. For the purpose of this analysis these numbers will be referred to as "small numbers." The smaller the number, the more specific the name. In English, numbers ranging from 0 to 12 have proper single names which do not follow any rule at all, each name is unique and shows no relationship with the others; numbers ranging from 13 to 19 also have single names, but this time the name is formed by combining a root taken from the names assigned to numbers 3 to 9 with a suffix "teen." A similar approach is used to name the remaining multiples of ten, 20 to 90, by using the suffix "ty." Numbers starting with 21 up to 99 not included in the later set, have a composite name made up from the name of the immediate lower multiple of 10 plus the unique name assigned to the number that corresponds to the remaining number of units; as illustration example, the number 37 is expressed as "Thirty-seven."

In Spanish a similar scheme is applied, except that numbers from 0 to 15, and multiples of 20 to 90 have been assigned single names, while every other number in the range have a composite name constructed in a way similar to the described above for English; as illustration example, the number 17 is expressed as "Diez y siete," many numbers like the one in this example have been assigned special concatenated single names; in Spanish, for example, the proper way to write the name of number 17 is "Diesisiete" instead of "Diez y siete."

It is interesting to notice the way some small numbers are constructed in French. For example, the numbers 70 and 80, instead or being assigned single names as its counterparts in other languages and other multiples of ten in the same language, are expressed with the composite names "Soixant Dix" and "Quatre vingts", which translated literally into English would mean "Sixty Ten" and "Four Twenties."

It follows from the discussion above, that small numbers have no general naming conventions, and the way they are expressed greatly depends on the language applied.

Unit Structures

In the case of numbers greater than 99, special single names have been assigned to some powers of ten, the most common are the names assigned to 100, 1,000 and 1,000, 000, which in English are "Hundred," "Thousand" and "Million." Equivalent names are also used in other languages, for example: "Cien," "Mil," and "Millon" in Spanish; "Cent," "Mille," and "Million" in French.

Larger powers of ten have also been assigned single names but not always have consistent meanings. The most typical case is the name "Billion" which in United States means one thousand millions (1,000,000,000) while in England it means one million millions (1,000,000,000,000). By the same token, the name "Trillion" in United States represents a unit followed by twelve zeroes, while in England it represents a unit followed by eighteen zeroes.

French notation fixes this inconsistency by assigning different names to the U.S. Billion and the English Billion. "Milliard" is used for 1,000,000,000, and "Billion" for 1,000,000,000,000.

For the purpose of this analysis, all the powers of ten greater or equal to 100 which have been assigned single names will be referred to as "unit structures."

The following table shows the different names assigned in several languages to the main unit structures:

| Unit | English | | | |
|---|---|---|---|---|
| Structure | US | UK | Spanish | French |
| 10**2 | Hundred | Hundred | Cien | Cent |
| 10**3 | Thousand | Thousand | Mil | Mille |
| 10**6 | Million | Million | Millon | Million |
| 10**9 | Billion | — | — | Milliard |
| 10**12 | Trillion | Billion | Billon | Billion |
| 10**18 | — | Trillion | Trillon | Trillion |

It follows from these observations, that the numbers "Hundred, " "Thousand," and "Million" are the only unit structures which remain consistent across all the Western languages.

Large Numbers and Order Parameters

Consistent with the definition given above for small numbers, a "large number" will be defined as any integer greater that 99; therefore, every large number is greater than at least one unit structure. For the purpose of this analysis, the largest available unit structure smaller than the number will be defined as the "Order" of the number. The Order of the number is a parameter of the number and can be used to represent the number by using the following expression:

$$number = int(number/Order) \times Order + rem(number/Order)$$

where int(number/Order) represents the result of applying an integer division of the number by its Order, and rem(number/Order) represents the remainder of the same operation. For the purpose of this analysis, the values of int(number/Order) and rem(number/Order) will be defined as the "Factor" of the number and the "Module" of the number, respectively. Therefore, above expression can be written as follows:

$$number = Factor \times Order + Module$$

Above expression may be generalized for all numbers if the order of small numbers is defined as 1. Notice that in this case the Factor is equal to the value of the small number and the Module is zero.

The following table shows some illustration examples of above defined concepts:

| number | Factor | Order | Module |
|---|---|---|---|
| 100,000 | 100 | 1,000 | 0 |
| 350 | 3 | 100 | 50 |
| 99 | 99 | 1 | 0 |
| 0 | 0 | 1 | 0 |
| 2,457,128 | 2 | 1,000,000 | 457,128 |
| 457,128 | 457 | 1,000 | 128 |

Verbal Numerical Expressions

As shown in the examples of the previous section, in some cases the Factor and/or the Module can be large numbers. In these cases, the original expression can be expanded recursively until all the Factors and Modules of the expression are small numbers as described in the following algorithm:

(1) find the Order, Factor and Module of the number;

(2) if the Factor is a large number, apply recursively steps (1) to (5) to obtain the Factor expression and then enclose the factor expression within parentheses, otherwise use the Factor as the Factor expression;

(3) if the Module is a large number, apply recursively steps (1) to (5) to obtain the Module expression, otherwise use the Module as the Module expression;

(4) if the order is greater than 1, append "Factor expression ×Order" to the number expression; otherwise, append "Factor expression to the number expression;

(5) if the module is greater than 0, append "+ Module expression" to the number expression.

FIG. 7 shows a flow diagram for the algorithm described above. Notice that the recursive procedure is applied twice, however, due to the similarity of steps (2) and (3), the procedure can be simplified to use only one single call to the recursive procedure by subtracting the product Factor× Order from the number and then repeating the procedures until the result is zero. The simplified procedure is shown in FIG. 8.

As illustration example, the application of above algorithm to number 457,128 yields the following expressions:

$$457 \times 1,000 + 128$$

$$(4 \times 100 + 57) \times 1,000 + 128$$

$$(4 \times 100 + 57) \times 1,000 + 1 \times 100 + 2.8$$

Now, it is interesting to realize that the expressions obtained by the application of above procedure have a total consistency with the verbal expression of the number. In fact, notice that the name of the number can be easily obtained just by arranging the names of the numbers and unit structures of the expression in the same order as they appear in the expression without paying attention to the arithmetic symbols used in the expression. For example, the final expression can be used to obtain the name of the number 457,128 by using exclusively the names of the small numbers and unit structures as follows:

(4 × 100 + 57) × 1,000 + 1 × 100 + 28 four hundred fifty-seven thousand one hundred twenty-eight.

The same procedure with minor adaptations can be used in languages other than English.

Because of this correlation with the verbal expression of a number, expressions obtained by applying the algorithm described above will be referred to as "Verbal Numerical Expressions," and the algorithm will be called "Verbal Expression Algorithm."

Notice that all the components of a verbal numerical expression must follow the order: "Factor×Order+Module;" if any component of the expression is permuted, the new expression, according with the commutative law of the numbers, will still represent the same number, however it will no longer be consistent with its verbal notation. For example, the following expression:

$$1,000 \times (4 \times 100 + 57) + 1 \times 100 + 28$$

still represents the number of the example, however, it is no longer consistent with its verbal notation. Notice that "thousand four hundred fifty-seven one hundred twenty-eight" is not even the name of a valid number.

Properties of Verbal Numerical Expressions

By observing the nature of the verbal numerical expressions, the following properties can be found:

a) the Module is always smaller than the Order;

b) whenever the Order is smaller than the largest unit structure available in the set of unit structures used to construct a verbal numerical expression, the Factor is smaller than the Order;

c) except for the representation of zero, Factor and Module components are always greater than zero; and d) Order components are always greater than 1.

Notice that consistent with properties (c) and (d), small numbers are never expressed as "Factor×Order+Module" in a verbal numerical expression.

Above properties may be used to determine if a given expression is a valid verbal numerical expression.

Structural Verbal Notation and Verbal Numerals

In the previous section it was shown that the name of a number is actually the representation of a verbal numerical expression. Another way to represent a verbal numerical expression is by assigning symbols to the unit structures (i.e.: "H, " "T" and "M" for Hundred, Thousand and Million) and combining them with the small numbers used in the verbal numerical expression in a mode similar to the way the name of the number is constructed orally.

As illustration example, the application of the verbal expression algorithm to the number 35,178,971 will yield the following intermediate and final verbal numerical expressions:

35×1,000,000+178,971

35×1,000,000+178×1,000+971

35×1,000,000+(1×100+78)×1,000+971

35×1,000,000+(1×100+78)×1,000+9×100+71.

These expressions can also be expressed symbolically with sequences of numbers and unit structure symbols as follows:

35M178971

35M178T971

35M1H78T971

35M1H78T9H71.

Some languages, like Spanish, omit the pronunciation of the Factor when it is equal to 1. As illustration example, the number "One thousand one hundred" (1T1H) is expressed in Spanish as "Mil cien" (TH). This seems to be a convenient feature to be included in a verbal numeral because it reduces the number of components required by some verbal numerals, for example, the number illustrated above could also be represented as follows:

35MH78T971

35MH78T9H71.

Since a verbal numerical expression represents a number, the symbolic representation of a verbal numerical expression will also represent a number. A numeral is the symbolic representation of a number, therefore all the symbolic representations of verbal numerical expressions are numerals.

For the purpose of this analysis, the symbolic representation of a verbal numerical expression will be called "Verbal Numeral."

Conversion of numbers into verbal numerals

Since a verbal numeral is the symbolic representation of a verbal numerical expression, the procedure used to obtain the verbal numeral of a number should be similar to the verbal expression algorithm.

The following is an algorithm that can be used to convert a number into a verbal numeral:

(1) find the Order, Factor and Module of the number;

(2) if the Factor is a large number, apply recursively steps (1) to (4) to obtain the verbal numeral of the Factor, otherwise use the decimal representation of the Factor as the verbal numeral of the Factor;

(3) if the Module is a large number, apply recursively steps (1) to (4) to obtain the verbal numeral of the Module, otherwise use the decimal representation of the Module as the verbal numeral of the Module;

(4) obtain the verbal numeral of the number by appending to the verbal numeral of the Factor the symbol of the Order and the verbal numeral of the Module, in that order.

FIG. 9 shows a flow-diagram with the simplified version of this algorithm.

Constructing the names of large numbers

There are many applications where it is desirable to build the textual name of a number. Example of these applications are programs and routines used to print the textual dollar amount in a check. Notice that the algorithm described in the previous section can easily be modified to build up the name of a number by replacing the symbols of the unit structures and the decimal representations of the small numbers with their corresponding names.

FIG. 10 shows a flow diagram with an algorithm to find the English name of a number. It may be easily adapted to other languages, for example, the explicit expression of the number "one" when preceding a unit structure must be done when implemented in Spanish.

Conversion of verbal numerals into numbers

The verbal expression algorithm can also be used to develop an algorithm to obtain the value of the number represented by a verbal numeral. Basically, this procedure should be equal to the verbal expression algorithm, except that this time the expression components are actually computed and added to the number, and the Order is extracted directly from the verbal numeral rather than computed from the number. The algorithm may be summarized as follows:

(1) find the Order symbol of the verbal numeral by locating the right-most symbol of the largest structure contained in the verbal numeral; if found, the Order is the absolute value of the Order symbol; otherwise the Order is 1;

(2) get the value of the Factor by using the segment of the verbal numeral located at the left side of the Order symbol, if no Order symbol is available, use the verbal numeral as the segment. If no segment is available the value of the Factor is 1. If the segment contains at least one structure symbol, apply recursively steps (1) to (4) on this segment to obtain the value of the Factor, otherwise use the value represented by the digits in the segment as the value of the Factor;

(3) get the value of the Module by using the segment of the verbal numeral located at the right side of the Order symbol, if no Order symbol or no segment is available, the value of the Module is zero. If the segment contains at least one structure symbol, apply recursively steps (1) to (4) on the segment to obtain the value of the Module, otherwise use the value represented by the digits in the segment as the value of the Module;

(4) determine the value of the number by using the following expression: Factor×Order+Module.

FIG. 11 shows a simplified version of above algorithm with a provision to check the validity of the verbal numeral.

The algorithm developed in this section can be implemented in the logic of a numerical data-entry device such as a calculator or computer to accept numbers entered in structured mode by using keys with structure symbols. The same procedure can also be adapted to enter numbers in voice recognition devices.

Advantages of Verbal Numerals

One obvious advantage of the Structural Verbal Notation is its consistency with the way the number is expressed orally. This allows to build a valid verbal numeral without applying the procedures described before, just by replacing the unit structures used to express the name of the number with the corresponding symbols and writing down the remaining numbers in the corresponding sequence.

In many instances verbal numerals require fewer number of symbols than decimal numerals. Here are several examples:

| | |
|---|---|
| 3,000,005 | 3M5 |
| 245,000,000,072 | 245M72 |
| 350,000 | 3H50T or 350T |
| 2,000,305 | 2M3H5 or 2M305 |
| 1,001,000 | 1M1T or MT |
| 1,000,000,000 | 1TM or TM |
| 1,000,000,100 | 1TM1H or TMH |

A large number usually may be represented by several verbal numerals, this provides a flexibility not available on decimal numerals.

Another advantage of verbal numerals (which is not so straight-forward) is its capability to grow gradually as the number is being pronounced orally. This property does not exist in the corresponding decimal numerals as shown in the following example:

In the construction of the number "Five Million Three Hundred Thousand Six" the following intermediate numerals are involved:

| Numeral Name | Decimal Numeral | Verbal Numeral |
|---|---|---|
| Five ... | 5 | 5 |
| million ... | 5,000,000 | 5M |
| three ... | 5,000,003 | 5M3 |
| hundred ... | 5,000,300 | 5M3H |
| thousand ... | 5,300,000 | 5M3HT |
| six | 5,300,006 | 5M3HT6 |

Notice that while the decimal numeral changes substantially in each intermediate step of the number, the verbal numeral does not change except for the addition of the new component to the previous numeral.

Above advantages can be used to streamline and simplify the data entry in numerical devices such as calculators and computers.

Extended Numerical Keyboards

All numerical keyboards have two categories of keys:

a) Number-entry keys.

b) Function keys.

Number-entry keys are the ones used to input a number into the device read buffer. In any numerical keyboard, number-entry keys can be clearly differentiated from function keys by the fact that pressing a number-entry key does not end the number entry procedure.

On the other hand, function keys are the ones that, whenever pressed, end the number entry procedure and starts another type of procedure associated with the nature of the function key pressed.

The most common number-entry keys are the digits 0 to 9 and the decimal period (dot key). Some scientific calculators also have an exponential key which allows the entry of numbers in scientific notation. Some business calculators have a "00" and a "000" key (multi-zero keys) to avoid pressing the zero digit several consecutive times when appropriate (i.e.: to enter zero cents in a currency amount). Another example of a number-entry key is the delete key which deletes the last digit entered.

The most common function keys are the following:

+ to add the number to the value in accumulator.

− to subtract the number from the value in accumulator.

× to multiply the number by the value in accumulator.

/ to divide the number by the value in accumulator.

= to display value in accumulator.

CE to clear entry in read buffer.

C to clear entry in read buffer and value in accumulator.

M+ to add number to value in memory.

M− to subtract number from value in memory.

MC to clear value in memory.

MR to copy value in memory to value in accumulator.

Scientific and business calculators also include specialized function keys used to manipulate the numbers in the memory and/or accumulators. In some cases, these functions can be programmed by the user to perform special manipulations.

FIG. 12 shows the main processing routine applied by an electronic calculator. The procedure basically consists of three main steps:

1) Initialization—Occurs when the calculator is turned on, all its registers and display are cleared and initialized.

2) Number Input Operation—while the user enters a consecutive sequence of number-entry keys, the calculator reads the number into an input number register and displays the contents of this register after every keystroke; this process ends when a function key is entered, then, the control flow advances to step (3).

3) Function Processing—the calculator performs the function corresponding to the function key entered in step (2) on the number stored in the input number register, the result is stored in an accumulator register and displayed in the calculator display. The input number register is cleared and the control flow returns to step (2).

FIG. 13 shows in more detail the logic involved in the number input operation of a conventional calculator. This logic basically reads a number-entry digit key and then updates the number stored in the input number register by performing an operation equivalent to multiplying such number by ten and adding the value of the digit entered, the updated number is displayed and the process is repeated after every keystroke until a function key is entered; provisions are taken to avoid overflow of the number in the input number register, and to track the position of the decimal point. In summary, this procedure accepts a sequence of digits corresponding to the decimal numeral entered by the user.

As described in the previous section, verbal numerals have several advantages over decimal numerals and therefore can be used with advantage during a number input operation. For this purpose, an extended numerical keyboard can be defined with three additional number-entry keys: one structure key for each unit structure in the set "H, T, M". This arrangement of keys would allow the data-entry of either decimal or verbal numerals in structured mode. To provide additional flexibility, a Swap key can be also included to allow the user to change the structured mode into conventional mode or vice versa during an input number operation.

Of course, since verbal numerals have no practical computational value, the number displayed by the device must be the decimal representation of the number even if the number is entered as a verbal numeral. In order to accomplish this objective, the device must store all the verbal numeral components (digits and/or structures) entered during the same input number operation, and use them as input to convert the verbal numeral into a decimal numeral every time a new component is added to the stored verbal numeral.

FIG. 14 shows an example of a logical procedure that could be applied to implement the input number operation in a device able to accept decimal numerals and/or verbal numerals. According with the implementation shown in FIG. 14, the input number operation always starts in structured mode and therefore the sequence of digits and/or structures is stored in a memory buffer that will be referred to as the "verbal numeral buffer." The maximum size required for the verbal numeral buffer may be determined by converting the largest number that can be displayed by the device into a verbal numeral and counting the number of components in the resulting verbal numeral, for example, if the maximum capacity of the display is 8 digits, then the largest number will be 99,999,999 which corresponds to 99M9H99T9H99 and the capacity of the buffer should be 12 key code cells.

Once a digit or structure has been accepted and stored in the verbal numeral buffer, the algorithm shown in FIG. 11 may be used to convert the new sequence of verbal numeral components stored in the verbal numeral buffer into a number; the number obtained by this conversion replaces the previous contents of the input number register; then, the new number is displayed and the device waits for a new keystroke.

If during the number input operation the user depresses the swap key, the data-entry mode changes from structured mode to conventional mode. In conventional mode the verbal numeral buffer is cleared because it is no longer required, and the code of each number-entry key depressed is used directly in updating the number with a procedure similar to the one used by conventional calculators (see FIG. 13); the only difference is that if a structure key is depressed while the device is in conventional mode, the keystroke is treated as if the zero key has been pressed multiple times, therefore, in conventional data-entry mode structure keys behave as conventional multi-zero keys.

Depressing the swap key during the course of a number input operation while the data-entry mode is set to conventional mode and no decimal point has been entered, will change the data-entry mode to structured mode. The contents of the input number register is used to convert the number into a verbal numeral by using the algorithm described in FIG. 9. The result of this conversion is stored in the verbal numeral buffer.

Entering a decimal point automatically changes the data-entry mode to conventional mode. This is because although the decimal portion of a number could in theory be entered in structured mode, it is not a practical way because users are not always familiar with the verbal expressions of a decimal fraction and these verbal expressions may vary widely from language to language.

Another feature included in the procedure described in FIG. 14, is the possibility of using the swap key as another function key if it is depressed before a new input number operation starts (while the input number register is set to zero). This hybrid nature of the swap key can provide additional possibilities to the nature of the functions used in the calculator, for example, "Swap" followed by a "M=" key could swap the contents of the memory with the contents of the accumulator without losing the value stored in the accumulator as it happens with most conventional calculators.

What is claimed is:

1. A decoding method for converting a verbal numeral into a number, wherein said verbal numeral is the symbolic representation of the verbal numerical expression of said number, wherein said symbolical representation comprises a sequence of decimal numerals and structure symbols representing the values 100, 1,000 and 1,000,000, wherein said sequence maintains a one to one correspondence with the components of said verbal numerical expression; said decoding method comprising the steps of:

(a) finding the order structure of said verbal numeral, wherein said order structure is the right-most structure symbol with the largest absolute value in said verbal numeral;

(b) determining the order value of said verbal numeral, wherein said order value is the absolute quantity represented by said order structure;

(c) determining the factor of said verbal numeral, wherein said factor is the number represented by the left verbal numeral, wherein said left verbal numeral is 1 or the sequence of all symbols located at the left side of said order structure when said sequence exists;

(d) determining the module of said verbal numeral, wherein said module is the number represented by the right verbal numeral, wherein said right verbal numeral is zero or the sequence of all symbols located at the right side of said order structure when said sequence exists;

(e) finding the value of said number by multiplying said factor by said order value, and adding to the result the value of said module.

2. A coding method for converting a number larger than into a verbal numeral, wherein said verbal numeral is the symbolic representation of the verbal numerical expression of said number, wherein said symbolical representation comprises a sequence of small decimal numerals and structure symbols representing the values 100, 1,000 or 1,000,000, wherein said sequence maintains a one to one correspondence with the components of said verbal numerical expression; said coding method comprising the steps of:

(a) determining the order of said number, wherein said order is the absolute value of the largest of said structure symbols with values less than or equal to the value of said number;

(b) determining the factor of said number, wherein said factor is the integer part of the result obtained by dividing said number by said order;

(c) determining the module of said number, wherein said module is the result obtained by subtracting the product of said factor by said order from said number;

(d) obtaining the verbal numeral of said factor when said factor is greater than 99 by recursively applying steps (a) through (h);

(e) obtaining the verbal numeral of said module when said module is greater than 99 by recursively applying steps (a) through (h);

(f) appending the symbolic representation of said order to said factor, or appending the symbolic representation of said order to the verbal numeral of said factor when said factor is greater than 99;

(g) when the module is greater than zero, appending to the sequence of symbols obtained in step (f) said module, or appending to the sequence of symbols obtained in step (f) the verbal numeral of said module when said module is greater than 99.

* * * * *